United States Patent Office 3,153,858
Patented Oct. 27, 1964

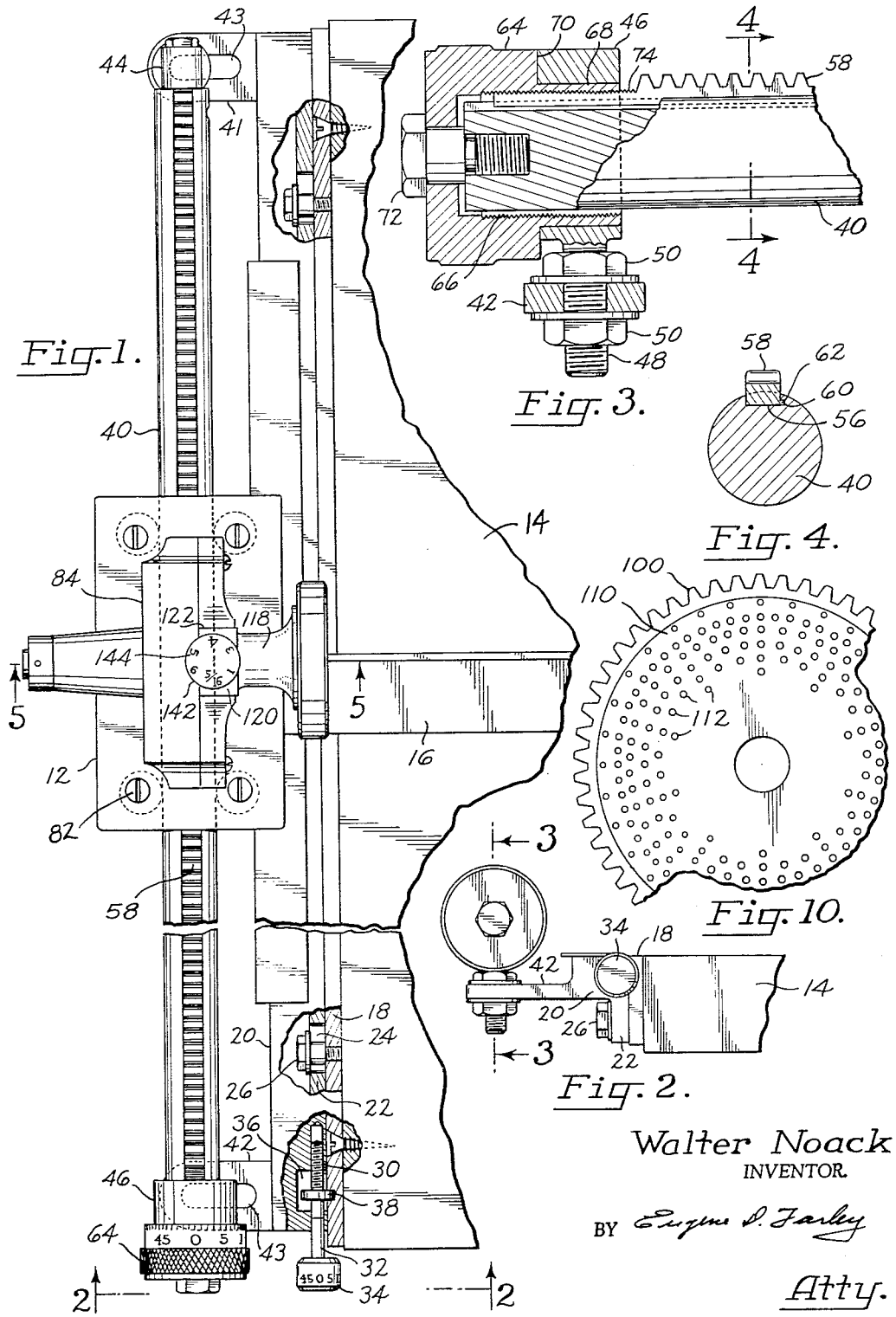

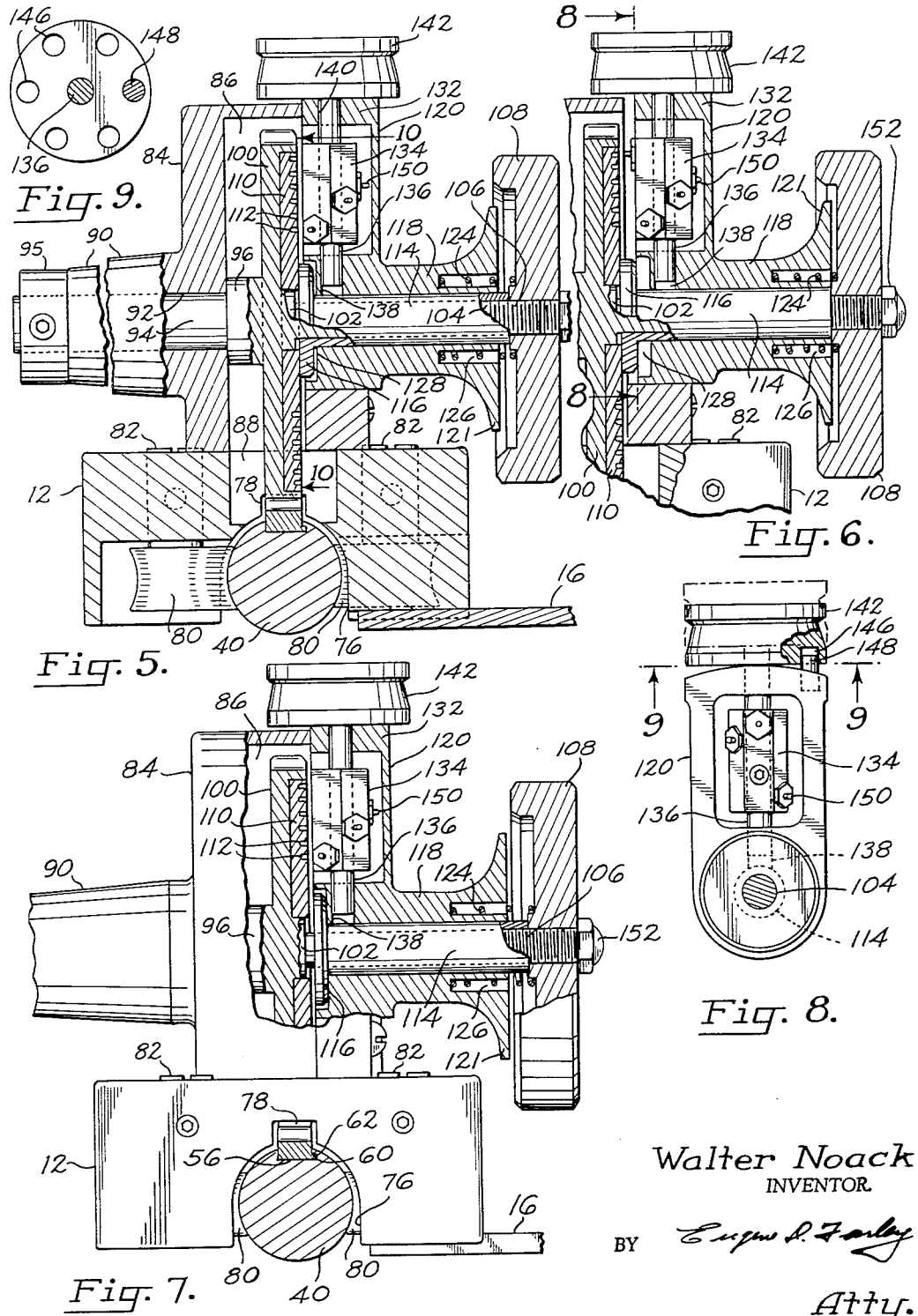

3,153,858
RULING APPARATUS
Walter Noack, 8555 SE. 36th, Milwaukie, Oreg.
Filed Aug. 7, 1961, Ser. No. 129,838
6 Claims. (Cl. 33—76)

This invention relates to a ruling apparatus and has as its main object to provide valuable improvements in the structure and operation of this type of apparatus.

Another object is to provide a ruling apparatus having improved means for accomplishing minute adjustment of the apparatus relative to a work table.

Another object is to provide a ruling apparatus having and improved structural arrangement comprising indexing means for advancing the apparatus incrementally along a work table and control means whereby to release the indexing means for freely advancing the apparatus along the work table.

Another object is to provide a ruling apparatus having improved means wherein the working parts for incrementally advancing it along a work table are arranged to have a minimum of wear whereby to facilitate accurate settings over a long period of time.

Another object is to provide a ruling apparatus having improved means providing for convenient incremental movement of the apparatus relative to a work table.

Another object is to provide a ruling apparatus having indexed setting means and safety locking means therefor, whereby accidental dislodgement of such setting means is prevented.

Another object is to provide an apparatus of the type described which is simple in construction and inexpensive to manufacture.

Briefly stated, the ruling apparatus of the present invention comprises a traveling carriage which is adapted to be moved incrementally relative to a work table by means of a rack gear meshing with a pinion gear on the carriage. The pinion gear is associated with an indexing plate and control means therefor whereby in one condition of the control means the pinion gear and plate are locked for integral rotation and in another condition of the control means the pinion gear is rotatable relative to the plate. In the first mentioned condition of control the carriage movement is thus influenced by the indexing plate and in the other condition of control the carriage is adapted to be moved freely along the rack. The indexing plate is associated with a pin carrier and control means therefor for establishing desired settings of the indexing plate.

The rack gear is movable relative to its supporting member for minute adjustment of the carriage independently of its incremental advancement under the control of the indexing plate. Furthermore, mounting means for the rack are adjustable for accomplishing further adjustment and for positioning the mounting means relative to the table.

The invention will be better understood and aditional objects thereof will become more apparent from the accompanying specification and claims considered together with the accompanying drawings, wherein like numerals of reference indicate like parts, and wherein:

FIGURE 1 is a fragmentary top plan view of a ruling apparatus embodying the principles of the present invention;

FIGURE 2 is a fragmentary elevational view taken on the line 2—2 of FIGURE 1 showing mounting and adjustment means for the apparatus;

FIGURE 3 is a sectional view taken on the line 3—3 of FIGURE 2 and showing in particular longitudinal adjustment means for the rack;

FIGURE 4 is a sectional view taken on the line 4—4 of FIGURE 3 showing in particular a slidable connection between the rack and its mounting means;

FIGURE 5 is a sectional view taken on the line 5—5 of FIGURE 1 showing the parts in detail and in a position of control whereby the pinion gear and indexing plate are locked together for integral operation, and showing the pin carrier in an operative position with the indexing plate;

FIGURE 6 is a fragmentary sectional view taken along the same line as FIGURE 5 but showing the pin carrier disengaged from the indexing plate;

FIGURE 7 is a fragmentary sectional view also taken along the same line as FIGURE 5 but showing the parts in a position of control whereby the pinion gear is adapted to rotate relative to the indexing plate;

FIGURE 8 is an end elevational view of a pin carrier control member, taken on the line 8—8 of FIGURE 6;

FIGURE 9 is a sectional view taken on the line 9—9 of FIGURE 8; and

FIGURE 10 is a fragmentary elevational view of the indexing plate, taken on the line 10—10 of FIGURE 5.

Referring particularly to the drawings and first to FIGURE 1, the present ruling apparatus comprises a traveling carriage 12 mounted on one side of work supporting means such as a table 14 and having a straight-edge 16 extending outwardly and across the table. In a preferred arrangement, table 14 has an end plate 18 forming a part thereof, also seen in FIGURE 2, on which is mounted a bracket 20. Bracket 20 has a depending right angle flange 22 provided with slots 24 which are elongated for the adjustable reception of screws 26 threadedly secured to end plate 18.

At one end of the bracket 20 is a threaded bore 30 which threadedly receives an adjusting screw 32 having a calibrated turning knob 34. Bore 30 is in registry with an opening 36 receiving a collar 38 which is secured to the screw 32 and which projects partially and rotatably into the adjacent wall portion of the end plate 18. Collar 38 thus anchors screw 32 against longitudinal movement and it will be apparent that upon rotation of the turning knob 34 relative movement between the bracket 20 and the end plate 18 of the table is accomplished.

A guide or support bar 40 is mounted in a position parallel to the end edge of the table by means of a pair of laterally extending lugs 41 and 42 on the bracket 20. These lugs are provided with elongated slots 43.

Associated with the lug 41 is a guide bar support 44 which may be secured to the end of the guide bar 40 and to the lug 41 in any suitable manner. Associated with the lug 42 and shown in detail in FIGURE 3 is a hollow guide bar support 46 having a threaded stem 48 projecting through slot 43. Stem 48 receives a pair of nuts 50 positioned one on each side of the lug 42 and serves to clamp the guide bar support 46 on the lug 42.

Guide bar 40 has an upper groove 56 best seen in FIGURES 4, 5 and 7, for the slidable reception of a rack gear 58 the teeth of which project above the top plane of the guide bar. Groove 56 has a laterally offset portion 60 to receive a correspondingly offset tongue 62 on the rack 58, such structure, while permitting relative slidable movement of these parts, serving to lock them together against vertical displacement.

With particular reference to FIGURE 3, which illustrates an improved adjustable end mounting structure for the guide bar 40 it will be apparent that the bar 40 is mounted on its support 46 in a stationary position but that means are provided for adjusting the rack longitudinally relative to the guide bar 40. For this purpose there is provided an adjusting nut or turning knob 64 having internal screw threads 66 and having a bearing hub 68 of reduced diameter. Hub 68 is rotatable within the hollow guide bar support 46 and since it is of reduced diameter it forms a shoulder 70 which abuts against the support 46. A screw 72 threadedly mounted in the end of the guide bar 40 is employed to hold the nut 64 on the guide bar in rotatable abutment with shoulder 70.

Rack 58 has a threaded portion 74 and this threaded portion engages nut threads 66 whereby upon rotation of nut 64 rack 58 is movable relative to the guide bar 40.

The bottom surface of carriage 12 is longitudinally recessed at 76, FIGURES 5 and 7, for receiving the guide bar 40, this recess being semi-circular at its upper portion to correspond substantially to the shape of the guide bar. A second longitudinal recess 78 is provided which extends upwardly from the recess 76 and is adapted freely to receive the projecting teeth of the rack 58. Guiding movement of the carriage along the guide bar 40 is accomplished by concaved guide rollers 80 supported on upright pins 82 mounted in suitable bores in the carriage. These rollers preferably are four in number, two being disposed at each end of the carriage. These rollers have eccentric mounted relation on the pins 82 so that they may be moved into a guiding position relative to the guide bar 40 by rotatable adjustment of the pins during assembly.

Forming a part of the carriage and extending upwardly therefrom is a gear housing 84 having an inner cavity 86 which communicates with a lower recess 88 opening into the longitudinal recess 76.

Gear housing 84 has a hub 90 and the housing and hub are provided with an axial bore 92 in which is journaled a shaft 94 having a set collar 95 on one projecting end thereof. As best seen in FIGURE 5, shaft 94 has integral structure comprising a first hub 96, a pinion gear 100 which is disposed in cavity 86 and projects through recess 88 for meshing relation with rack 58, a second hub 102, and a stem 104 having a threaded end 106 for threadedly receiving a hand wheel 108.

Second hub 102 of the shaft 94 forms a journaled support for an indexing plate 110 which as apparent in FIGURE 10 is provided with a plurality of holes 112 arranged in concentric circles. Holes 112 in each circle are equally spaced but the spacing varies in different circles.

Slidably supported on the stem 104 is a thrust sleeve 114 having a flanged end 116 adapted to abut against indexing plate 110. As best seen in FIGURE 5 sleeve 114 is somewhat shorter than stem 104 but the outer end thereof is adapted to be engaged by the hand wheel 108 whereby upon tightening of the latter the flanged portion 116 engages the indexing plate 110 to force it against gear 100. In the tightened condition of hand wheel 108 an integral connection thus is provided between the gear 100, indexing plate 110, sleeve 104 and hand wheel 108.

Slidably mounted on the sleeve 114 is a pin carrier control member 118 having a radially extending hollow projection 120 and a flanged end portion 121. With reference to FIGURE 1, radial projection 120 is confined in a radial groove 122 in the gear housing 84. Control member 118 is biased toward the indexing plate 110 by means of a compression spring 124, FIGURES 5–7, seated in an annular groove 126 in the flanged end of the member 118 and engaging the hand wheel 108. The inner end of the member 118 is recessed at 128 to receive the flanged end 116 of the thrust sleeve 114.

Radial projection 120 has a top wall 132 and houses a pin carrier or index selector 134 supported on a shaft 136. The lower portion of the shaft 136 is journaled in a bore 138 in the control member and the upper portion is journaled in a bore 140 in the top wall 132 of the projection 120. Secured to the upper end of shaft 136 is a turning knob 142 having index setting designations 144, FIGURE 1, on its top surface.

The bottom surface of turning knob 142 has a plurality of apertures 146, FIGURE 9, and projection 120 has an upwardly extending lock pin 148 adapted to be engaged with these apertures. Apertures 146 correspond in number to the number of index setting designations 144 on the top surface and are located directly beneath the said designations. The vertical dimension of pin carrier 134 is less than the vertical interior dimension of hollow projection 120 whereby such carrier is adapted to be reciprocated vertically a limited amount, the extent of reciprocation being shown by the dotted lines of FIGURE 8 as applied to the knob 142 and being sufficient to disengage lock pin 148 from an aperture 146.

Secured to the carrier 134 are index pins 150 arranged to engage the holes 112 in the indexing plate 110. These pins are spaced circumferentially around the carrier 134 and are disposed in different vertical planes whereby an individual pin is provided for each circle of holes 112. In a preferred construction carrier 134 may have multiple sides as shown for mounting the pins thereon. By means of this pin carrier structure, wherein each circle of holes 112 is associated with an independent pin 150, a minimum of wear results whereby accurate settings over a long period of time are accomplished.

For operation of the present device the traveling carriage 12 is first installed on the guide bar 40 with the gear 100 in mesh with the rack 58. When it is desired to advance the carriage in equally spaced increments the hand wheel 108 is threaded tightly against the sleeve 114 whereby the flange 116 of the sleeve firmly abuts against the index plate 110 and locks it in a frictional non-rotative relation with the gear wheel 100. For establishing the desired increment of advancement, the pin carrier control member 118 is first retracted to the position shown in FIGURE 6 against the action of spring 124. Thereupon, the pin carrier 134 is lifted upwardly by means of knob 142 to disengage this knob from the lock pin 148. The knob 142 then is turned to a selected position depending upon which circle of holes 112 is desired for engagement, the setting desired being visually apparent from setting designations 144. At such setting the depending lock pin 148 registers with an aperture 146 and the pin carrier drops into its lower position. The pin carrier control member is then released and the pin 150 thus selected engages its circle of holes 112 in plate 110. Since the operator stands at the edge of the table adjacent the turning knobs 34 and 64, the setting designations 144 on the knob 142 are arranged such that the designation being used is the one facing the operator. For example the designation 5/16 in FIGURE 1 is in the position of indication.

The traveling carriage 12 may then be moved in equally spaced increments along the work table first by retracting control member 118 and then rotating hand wheel 108 slightly to move a previously engaged hole 112 out of alignment with its pin 150. The control member 118 is then released and the wheel 108 rotated until the pin 150 stops the carriage by engaging the next hole 112.

If it is desired to rule a double line or otherwise to position the straightedge with reference to a selected location, adjusting nut 64 is operated which as explained hereinbefore moves the rack 58 and consequently the carriage 12 longitudinally relative to the support 40 and table 14. The selected advancement of the carriage by rotation of adjusting nut 64 is determined precisely by the calibrations thereon.

At times it may be desired to advance the carriage 12 rapidly to another position relative to the table and for this purpose the hand wheel 108 is loosened on the threads 106 of stem 104 to disengage the sleeve 114 from the index plate 110, FIG. 7, and thus permit relative rotation between the index plate and the gear 100. Thus the rotation of gear 100 is not then controlled by the pins 150 and the carriage can be rolled freely along the rack to the desired position. If it is then desired to draw equally spaced lines from this position the hand wheel 108 is tightened to connect index plate 110 and the gear 100.

For the purpose of preventing hand wheel 108 from being completely removed from the stem 106 the stem may be elongated sufficiently to extend beyond the hand wheel and carry a jamb nut 152, FIGURE 7, the clearance between the jamb nut and hand wheel being sufficient to allow the necessary retraction of the latter.

By the structural arrangement of the present ruling apparatus the carriage 12 may be moved in equally spaced increments by the use of the indexing plate 110 upon tightening of hand wheel 108 or it may be moved freely upon loosening of the hand wheel. The carriage may be adjusted minutely in either of these control conditions by operation of adjusting nut 64. The flanged portion 121 of pin carrier control member 118 is located closely adjacent the hand wheel 108 so that retraction of the control member and rotation of the hand wheel for the incremental operation of the carriage can be accomplished with one hand. It is to be noted further that all the control or adjusting means are located in a position of convenience for the operator.

It is to be understood that the form of my invention herein shown and described is to be taken as a preferred example of the same and that various changes in the shape, size and arrangement of parts may be resorted to without departing from the spirit of my invention or the scope of the subjoined claims.

Having now described my invention and in what manner the same may be used, what I claim as new and desire to protect by Letters Patent is:

1. A ruling apparatus comprising a guide bar, a rack on the guide bar, a straightedge supporting carriage movably mounted on the guide bar, a gear wheel rotatably mounted on the carriage and meshing with the rack for driving the carriage along the rack, an index plate mounted in face to face relation with the gear wheel and arranged for removable frictional engagement therewith, and control means, and a hand wheel operably connected with said control means, said hand wheel and control means having a first position frictionally interlocking the gear wheel and the index plate for indexing rotation of the gear wheel and having a second position providing unlocked relation of the gear wheel from the index plate and hand wheel to permit free rotation of the gear wheel.

2. A ruling apparatus comprising a guide bar, a rack on the guide bar, a straightedge supporting carriage movably mounted on the guide bar, a shaft rotatably mounted in the carriage having a projecting threaded portion, a gear wheel integral with the shaft meshing with the rack for driving the carriage along the rack, an index plate journaled on the shaft in face to face relation with the gear wheel, a hand wheel threadedly mounted on the projecting shaft portion, a sleeve on the shaft intermediate the index plate and the handwheel, the hand wheel having an inwardly threaded position on the shaft urging the sleeve against the index plate to interlock the gear wheel and the index plate and provide indexing rotation of the gear wheel and having a retracted threaded position on the shaft to release the index plate from the gear wheel to permit free rotation of the gear wheel.

3. In a ruling apparatus, drive means for moving the apparatus along a work table, indexing means having at least two concentric rows of index holes, a rotatable pin carrier disposed adjacent the indexing means, and index pins on the pin carrier adapted to engage the index holes, the pins being equal in number to the number of rows of holes and being spaced vertically and circumferentially on the pin carrier for individual engagement with the holes.

4. The apparatus of claim 3 including a slidable control member supporting the pin carrier whereby the latter is adapted to be moved into and out of pin engaging position with the indexing means, and lock means on the pin carrier holding the latter in non-rotative position when in pin engaging position.

5. A ruling apparatus comprising a guide bar, a rack on the guide bar, a straight edge supporting carriage movably mounted on the guide bar, a gear wheel rotatably mounted on the carriage and meshing with the rack for driving the carriage along the rack, a rotatable index plate mounted adjacent the gear wheel, means mounting the index plate for movement toward and away from the gear wheel for releasable engagement therewith, movable control means engageable with the index plate having a first position urging the index plate into engagement with the gear wheel for unitary rotation of the index plate and gear wheel and having a second position providing released association of the index plate and gear wheel for relative rotation, and index selector means engageable with the index plate to provide indexing rotation of the index plate in the engaged position of the latter with the gear wheel.

6. The ruling apparatus of claim 5 including work supporting means, a bracket slidably mounted longitudinally on the work supporting means and supporting the guide bar, and screw threaded adjustment means interconnected between the work supporting means and the bracket to provide longitudinal adjustment of the bracket relative to the work supporting means.

References Cited in the file of this patent
UNITED STATES PATENTS

| | | |
|---|---|---|
| 386,469 | Howard | July 24, 1888 |
| 539,492 | Stone | May 21, 1895 |
| 1,267,075 | Hubbell | May 21, 1918 |
| 2,100,114 | Walsh | Nov. 23, 1937 |
| 2,400,715 | Sandberg | Oct. 27, 1943 |
| 2,441,317 | Gribble | May 11, 1948 |
| 2,657,467 | Lewis | Nov. 3, 1953 |